US008013245B2

(12) United States Patent
Korcz et al.

(10) Patent No.: US 8,013,245 B2
(45) Date of Patent: Sep. 6, 2011

(54) WEATHERPROOF COVER ASSEMBLY FOR AN ELECTRICAL BOX HAVING A WATER INTRUSION BARRIER

(75) Inventors: Krzysztof W. Korcz, Granger, IN (US); Mahran Husain, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 356 days.

(21) Appl. No.: 12/262,496

(22) Filed: Oct. 31, 2008

(65) Prior Publication Data

US 2010/0108374 A1 May 6, 2010

(51) Int. Cl.
*H05K 5/03* (2006.01)

(52) U.S. Cl. ............... 174/66; 174/53; 174/67; 220/3.2; 220/241; 220/242

(58) Field of Classification Search .................. 174/480, 174/481, 50, 53, 57, 58, 66, 67, 520; 220/3.2–3.9, 220/4.02, 241, 242; 248/906; 439/535, 536
See application file for complete search history.

(56) References Cited

U.S. PATENT DOCUMENTS

| | | | |
|---|---|---|---|
| 4,381,063 A | 4/1983 | Leong | |
| 4,950,842 A | 8/1990 | Menninga | |
| 5,228,584 A | 7/1993 | Williams, Jr. | |
| 5,317,108 A * | 5/1994 | Prairie, Jr. | 174/67 |
| 5,456,377 A | 10/1995 | Williams, Jr. | |
| 6,133,531 A * | 10/2000 | Hayduke et al. | 174/67 |
| 6,437,242 B1 * | 8/2002 | Radosavljevic et al. | 174/67 |
| 7,005,578 B2 * | 2/2006 | Gretz | 174/58 |
| 7,348,486 B1 | 3/2008 | Shotey et al. | |
| 7,368,662 B1 | 5/2008 | Shotey et al. | |
| 7,381,894 B1 | 6/2008 | Shotey et al. | |
| 7,381,895 B1 | 6/2008 | Shotey et al. | |
| 7,390,966 B1 | 6/2008 | Shotey et al. | |
| 7,396,996 B1 | 7/2008 | Shotey et al. | |
| 7,410,372 B2 * | 8/2008 | Johnson et al. | 174/66 |
| 7,476,806 B2 * | 1/2009 | Dinh | 174/58 |
| 2007/0181328 A1 | 8/2007 | Dinh | |

* cited by examiner

*Primary Examiner* — Angel R Estrada
(74) *Attorney, Agent, or Firm* — Garrett V. Davis; Mark S. Bicks; Alfred N. Goodman

(57) ABSTRACT

A cover assembly for attaching to an electrical box includes housing and a cover hinged to the housing. The assembly is mounted to the electrical box to protect an electrical device from moisture while allowing access to the electrical device. The housing has an inner chamber, an outer chamber and an access opening into the outer chamber for the electrical cord that can be connected to the electrical device. The cover assembly is provided with a water barrier member between the inner chamber and the outer chamber to inhibit water and debris from entering the housing of the cover assembly through the access opening.

28 Claims, 5 Drawing Sheets

WEATHERPROOF COVER ASSEMBLY FOR AN ELECTRICAL BOX HAVING A WATER INTRUSION BARRIER

FIELD OF THE INVENTION

The present invention is directed to an electrical box cover assembly for use with an electrical box. The cover assembly has a housing including a base, and a body and a cover pivotally connected to the housing. The body is provided with an outer chamber forming an access opening into the body for directing electrical wires into the cover assembly for connecting with an electrical device enclosed by the cover assembly. The invention is also directed to a cover assembly having a barrier member to inhibit water and dirt from entering the inner chamber of the housing through the access opening in the outer chamber.

BACKGROUND OF THE INVENTION

Electrical boxes are mounted in various locations and positions depending on the particular application. Electrical boxes that are mounted outside and exposed to the weather require suitable shielding to protect the electrical device and electrical plugs and cords from the weather and particularly rain. Therefore, electrical outlet boxes mounted outside typically have one or more covers to close around the electrical device and the electrical cords.

Although building codes may vary between areas, most codes require the cover to be self-closing so that cover will automatically close around the electrical device when released. The cover is either spring biased or gravity operated. The gravity operated covers are often preferred since they eliminate additional parts and springs and are less likely to malfunction.

The gravity operated devices require the hinge to be located along a top portion of the body or mounting face plate so that the cover will pivot downwardly to a closed position by the weight of the cover. The body of the assembly is often constructed to have a removable face plate for attaching to the electrical device or mating with an electrical device. The removable face plate can be replaced with another face plate having an opening oriented to accommodate the electrical device so that the cover is oriented to close by the weight of the cover.

One example of a weatherproof cover assembly is disclosed in U.S. Pat. No. 7,410,372 to Johnson et al. This cover assembly includes a base or face plate attached to the wiring device and snapped to a bottom side of a body member. A cover is hinged to the body to enclose the electrical device and the wires. Another example of a cover assembly having a removable plate is disclosed in U.S. Pat. No. 5,280,135 to Berlin. In this device, one removable plate can be replaced with a different plate where each plate has a different shaped opening to accommodate different electrical devices.

Another construction of cover assemblies that can be mounted in different orientations has a hinge member on two adjacent sides of the body and two adjacent sides of the cover. The body and cover can be oriented in the selected horizontal or vertical position and the appropriate members are coupled together. The hinge members that are not being used can be removed or are positioned to be inactive. Examples of this type of cover are disclosed in U.S. Pat. No. 6,891,104 to Dinh, U.S. Pat. No. 6,987,225 to Shotey, U.S. Pat. No. 4,874,906 to Shotey and U.S. Pat. No. 4,803,307 to Shotey.

Another cover assembly is disclosed in U.S. Pat. No. 6,133,531 to Hayduke. This assembly includes a body portion and a hinged cover. The hinge is mounted on a corner between two adjacent sides of the cover and body so that the cover pivots along an axis that is diagonal with respect to the longitudinal dimension of the cover and body. The cover and body can be mounted in a horizontal or vertical orientation so that the cover will close by the weight of the cover.

Another example of a while-in-use electrical box assembly is disclosed in U.S. Patent Publication No. 2007/0181328 to Dinh. The assembly includes a hinged cover and cord holder extension to hold the cord when the cover is open. Other cover assemblies are disclosed in U.S. Pat. No. 4,950,842 to Menninga, U.S. Pat. No. 4,381,063 to Leong, U.S. Pat. No. 5,228,584 to Williams, and U.S. Pat. No. 5,456,377 to Williams.

While the above assemblies are generally acceptable for the intended purpose, there is a continuing need for an improved cover assembly.

SUMMARY OF THE INVENTION

The present invention is directed to an electrical box cover assembly for attaching to an electrical box to enclose an electrical device. The invention is further directed to a cover assembly for an electrical device having a protective chamber for inhibiting water and dirt from entering the cover assembly and the electrical device.

The cover assembly of the invention includes a housing formed by a body and a base that are coupled together. A cover is hinged to the housing to enclose an open end of the housing.

One aspect of the invention is to provide a weatherproof outlet cover assembly having a housing mounted to an electrical box and a cover hinged to the housing where the cover assembly has an inner chamber and an outer chamber. The outer chamber is aligned with an opening between the housing and the cover to enable an electrical cord to pass between the inner chamber and the outer chamber. The outer chamber is oriented in a manner to inhibit water and dirt from passing through the opening in the cover assembly without restricting the passage of the electrical cord.

Another aspect of the invention is to provide a weatherproof cover assembly having an inner chamber and an outer chamber and an opening extending between the inner chamber and the outer chamber where a barrier is provided between the inner chamber and the outer chamber to inhibit water and dirt from entering the inner chamber. The cover assembly can have a body with a side wall defining the inner chamber and have external walls forming the outer chamber. The side wall of the body forms the barrier between the inner chamber and the outer chamber. In one embodiment, the outer chamber has a cord access opening aligned with the barrier to form a circuitous path through the opening or passageway between the inner chamber and the outer chamber.

The aspects of the invention are further obtained by providing a weatherproof assembly having an inner chamber and an outer chamber and an opening extending between the inner chamber and the outer chamber where the outer chamber includes at least one hold down member for retaining an electrical cord in a desired position. The outer chamber can have two spaced apart hold down members for positioning two separate electrical cords and a divider member positioned between the cords to position the cords and guide the cords through the opening.

The cover assembly of the invention is constructed for mounting vertically or horizontally. The cover assembly includes a housing and cover where the cover and housing mate and has a cord access opening between the cover and the housing to allow an electrical plug to be connected to an electrical receptacle when the cover is closed. In one embodiment of the invention the cord access opening provided between cover and housing is positioned below a top edge of a side wall of the housing so that the path of the electrical cord has a U-shaped bend. The access opening in a preferred embodiment is in an outer chamber which is separated from the inner chamber of the housing by a barrier member or side wall of the housing.

These and other aspects of the invention are basically obtained by providing a cover assembly for an electrical box, comprising a housing for coupling to an electrical box, the housing having a bottom wall for coupling to the electrical box and a side wall defining an inner chamber. The housing has an outer chamber for guiding an electrical cord to the inner chamber. The inner chamber and the outer chamber are separated by a barrier member. A cover is hinged to the housing and is pivotable between an open position and a closed position where the cover overlies the first and second chambers when in the closed position. The cover assembly also includes an access opening for an electrical cord.

The various aspects of the invention are also obtained by providing a weatherproof cover assembly for an electrical box comprising a housing for coupling to an electrical box. The housing has an inner chamber with a first side wall and an opposite second side wall and an inner chamber therebetween. An outer chamber having an access opening for receiving an electrical cord is in communication with the inner chamber. The access opening in the outer chamber is positioned to define a circuitous path from the access opening to the inner chamber to inhibit water from entering the inner chamber. A cover is hinged to the housing and is movable from an open to a closed position to cover the inner chamber and the outer chamber.

The aspects of the invention are further obtained by providing a weatherproof while-in-use cover assembly comprising an electrical box supporting an electrical device and a housing coupled to the electrical box. The housing has a bottom wall with an opening for accessing the electrical device and a side wall extending from the bottom wall and defining an inner chamber. The housing further includes an outer chamber separated from the inner chamber by the side wall. A cover is hinged to the housing and is pivotable between an open and closed position where the cover overlies the first and second chambers when in the closed position.

These and other aspects of the invention will become apparent from the following detailed description of the invention which, taken in conjunction with the annexed drawings, disclose various embodiments of the invention.

BRIEF DESCRIPTION OF THE DRAWINGS

Referring to the drawings which form a part of this original disclosure in which.

DETAILED DESCRIPTION OF THE INVENTION

The present invention is directed to a weatherproof electrical cover assembly for attaching to an electrical box to enclose an electrical device supported by the electrical box. In particular, the invention is directed to a weatherproof or weather resistant cover assembly having a hinged cover where the cover assembly has an access opening for an electrical cord so that the electrical cord can be connected to the electrical device when the cover is in the closed position. The cover assembly of the invention is constructed to inhibit water and dirt from entering the housing of the cover assembly through the access opening while enabling the electrical cord to pass through the access opening and be connected to the electrical device with the cover in the closed position.

Figure 1:
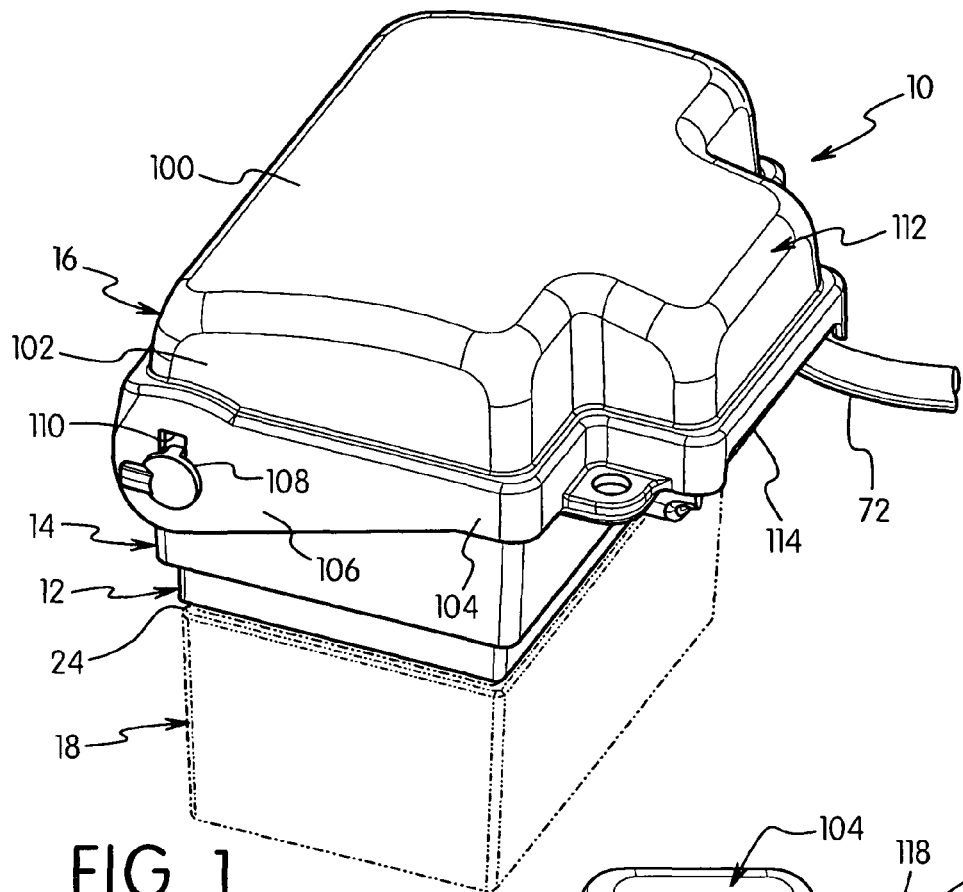
FIG. 1 is a perspective view of the weatherproof cover assembly in one embodiment of the invention.

Referring to the drawings, the weatherproof cover assembly 10 of the invention has a housing 11 which includes a base 12 and a body 14 and cover 16 mounted to the housing. As shown in FIG. 1, the cover assembly 10 is connected to an electrical box 18 that supports an electrical device 20. In the embodiment illustrated, electrical device 20 is an electrical duplex receptacle for receiving a plug 22. The electrical box 18 can be a standard electrical box which is mounted to a support such as a wall or post. The electrical box 18 is mounted to the support in a conventional manner such as by nails, screws or other fasteners. The electrical box in other embodiments can be mounted within a wall structure so that the front edge of the electrical box is aligned with the outer surface of the wall. Electrical wiring is connected to the electrical receptacle 20 through the electrical box 18 in a conventional manner.

Figure 5:
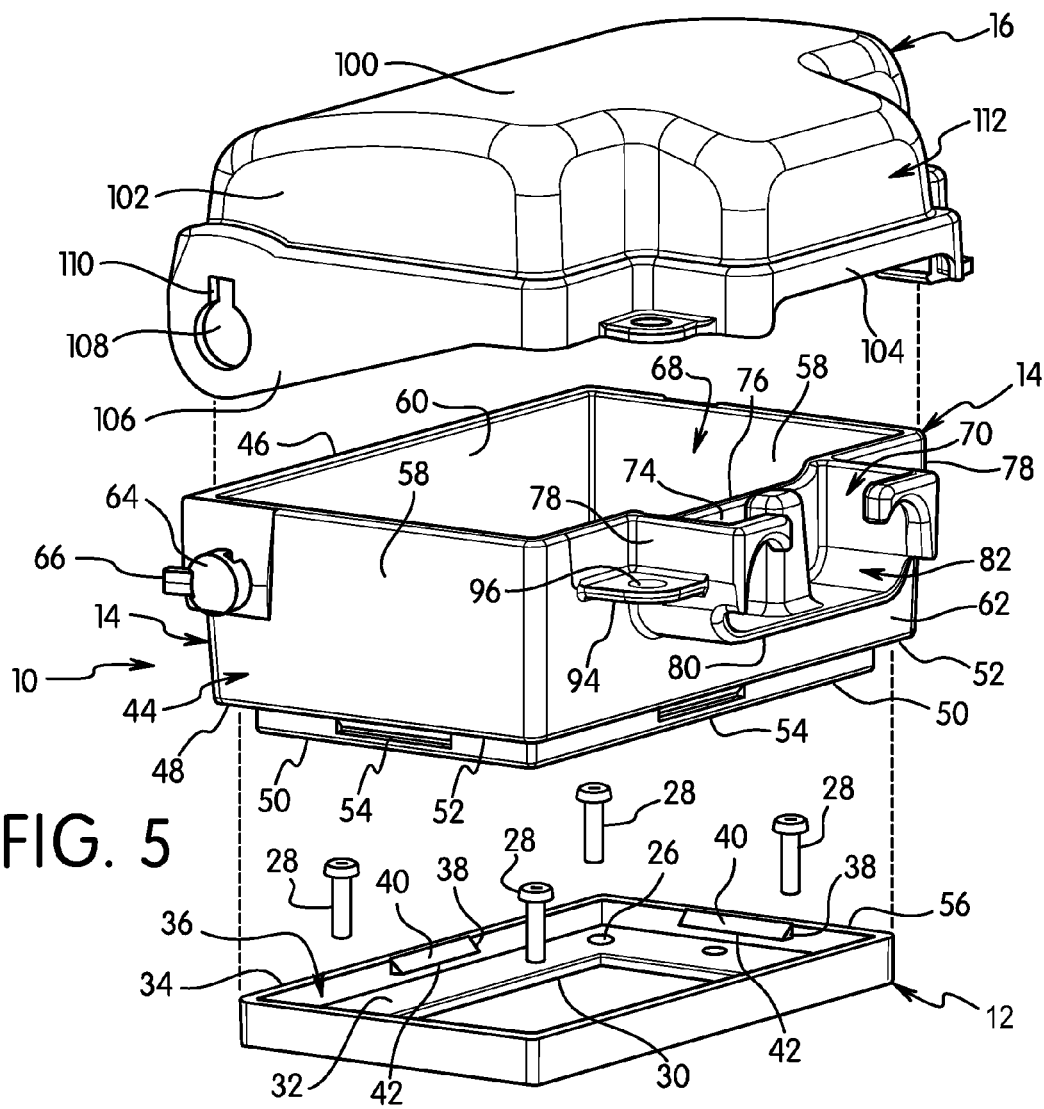
FIG. 5 is an exploded perspective view of the cover assembly of FIG. 1.

Referring to FIG. 5, base 12 has a shape and dimension corresponding substantially to the open top end of electrical box 18 for mounting directly to electrical box 18. A gasket 24, shown in FIGS. 1 and 3, can be provided between the bottom side of base 12 and the open top end of electrical box 18 to provide a weatherproof seal.

Base 12 includes a plurality of screw holes 26 for receiving mounting screws 28. Mounting screws 28 pass through holes 26 and are threaded into threaded holes in the electrical box 18 for securely coupling base 12 to electrical box 18. Base 12 includes a central opening 30 in the embodiment illustrated for receiving the front face of electrical device 20. Base 12 functions has a cover plate for electrical device 20 and electrical box 18 and as an attachment mechanism for the body 14.

In the embodiment illustrated, base 12 has a bottom wall 32 with a peripheral flange 34 extending around the outer edge in an upward direction substantially perpendicular to the plane of bottom wall 32. In the embodiment illustrated, base 12 has a substantially rectangular configuration to accommodate a single electrical device in a single gang box. In other embodiments, base 12 can have a substantially square configuration to accommodate a two gang electrical box and two electrical devices.

Flange 34 forms a continuous edge around the peripheral edge of bottom wall 32 to form an open top end 36 of base 12.

Flange 34 has a shape corresponding to the shape of base 12 and has an inner dimension for mating with a bottom end of body 14. Flange 34 is preferably dimensioned to form a water tight seal between base 12 and body 14.

As shown in FIG. 5, each side edge of flange 34 includes a hook-shaped coupling member 38 extending inwardly from the inner face of flange 34. Preferably, each longitudinal side and each transverse side of flange 34 includes a coupling member 38 for coupling with body 14. Each coupling member 38 has an inclined top surface 40 and a substantially flat bottom surface 42 extending substantially perpendicular to the plane of flange 34 to define a coupling tab.

Body 14 has a side wall 44 with a top end 46 and a bottom end 48. Side wall 44 has a height to accommodate electrical plugs and wires enclosed by the cover assembly 10. Body 14 has an open top end and an open bottom end that form a through passage. Bottom end 48 of body 14 includes an axial lip 50 forming a shoulder 52, as shown in FIG. 5. Shoulder 52 defines a bottom edge of side wall 44. Axial lip 50 extends in a substantially axial direction with side wall 44 and is spaced inwardly from the outer surface of side wall 44. In a preferred embodiment, lip 50 forms a continuous ring extending around the peripheral edge of body 14.

Lip 50 has an axial length corresponding substantially to the axial length of flange 34 of base 12. Axial lip 50 has an outer dimension corresponding substantially to the inner dimension of flange 34 base 12. The outer surface of axial lip 50 includes a recess 54 complimenting the shape of each hook-shaped coupling member 38 for coupling base 12 to body 14. The inclined top surface 40 of coupling member 38 enables base 12 to snap onto axial lip 50 of body 14. Preferably, base 12 is coupled to body 14 in a manner to form a weather-tight seal between base 12 and body 14. Preferably, each recess 54 has a length complimenting the length of hook-shaped coupling member 38 and is oriented to couple directly with each coupling member 38.

Base member 12 is assembled onto body 14 by coupling members 38 and the corresponding recess 54. The axial lip 50 of body 14 extends in a generally axial direction and is dimensioned to fit within the open top end of flange 34 of base 12. Flange 34 of base 12 fits over lip 50. A chamfered inner edge 56 contacts the inclined top surface 40 of coupling member 38 during insertion of lip 50 into the open end of flange 34. A force applied against base 12 causes the side portions of flange 34 to flex outward a distance to enable lip 50 to slide past coupling members 38 and snap into the respected recess 54.

Base 12 and body 14 are preferably made with a plastic material that enables the components to snap together and have sufficient strength to satisfy the requirements of a weatherproof cover assembly. Base 12 and body 14 are made of a sufficiently rigid material to remain coupled together during use without inadvertent separation. In an alternative embodiment, the base and body can be made as a one piece integrally molded unit to form housing 11.

Side wall 44 of body 14 includes end walls 58 and side walls 60 and 62. End walls 58 adjacent first end wall 60 include a pivot pin 64 extending outwardly for pivotally connecting cover 16 to body 14. As shown in FIG. 5, pivot pin 64 includes a radially extending leg 66.

In the embodiment illustrated, body 14 and side wall 44 form an inner chamber 68 which has a dimension to receive the electrical device, plug and electrical cord. The height of side wall 44 can depend on the dimensions of electrical device 20, the dimensions of plug 22 and the dimensions of cover 16. Body 14 is also formed with an outer chamber 70 having a dimension for receiving electrical cord 72 of plug 22. Outer chamber 70 is separated from inner chamber 68 by a barrier member 74. In the embodiment illustrated, barrier 74 is formed as an integral part of wall 62. Barrier member 74 in one embodiment is formed as a portion of wall 62 and lies in the plane of wall 62. Barrier 74 has a top edge 76 cooperating with top end 46 of side wall 62. In the embodiment illustrated, top edge 76 of barrier 74 has a slight concave shape and is spaced below top end 46 of side wall 44 and wall 62.

In the embodiment illustrated, outer chamber 70 is formed by side walls 78 and bottom wall 80 which extend perpendicular from front wall 62. As shown in FIG. 5, outer chamber 70 has a dimension less than inner chamber 68 and a dimension to receive the electrical cord 72. Side walls 78 of outer chamber are spaced inwardly from the end walls 58 of body 14 and bottom wall 80 is spaced from bottom end 48 of body 14. In one preferred embodiment of the invention, outer chamber 70 is integrally formed with body 14 as a one piece molded unit. In alternative embodiments, outer chamber 70 can be constructed separately and attached to body 14 by a suitable fastening means.

Figure 6:
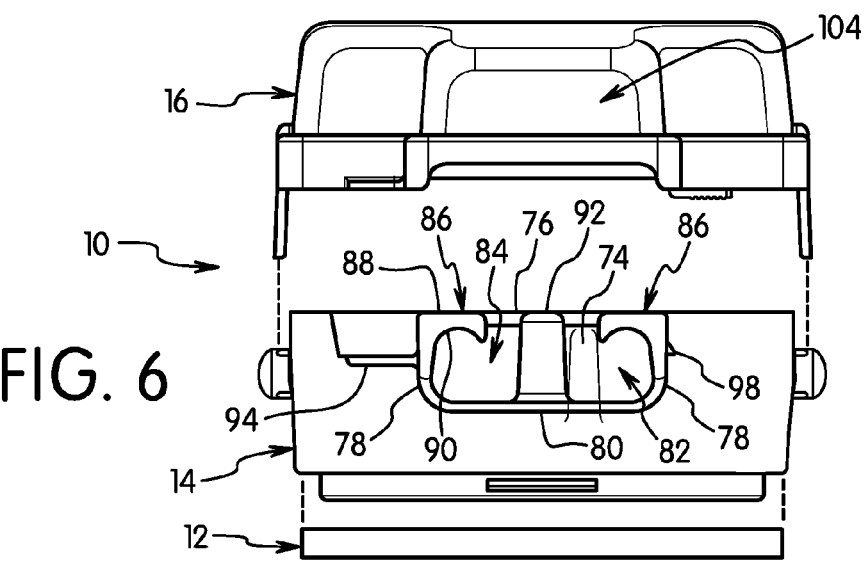
FIG. 6 is an exploded front elevational view of the cover assembly of FIG. 1.
Figure 11:
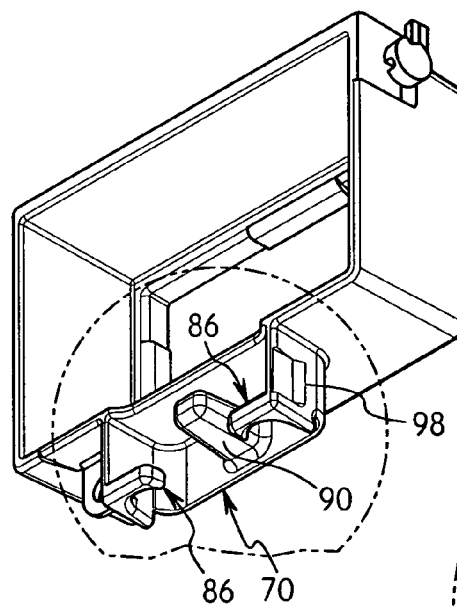
FIG. 11 is a perspective view of the body of the cover assembly.
Figure 12:
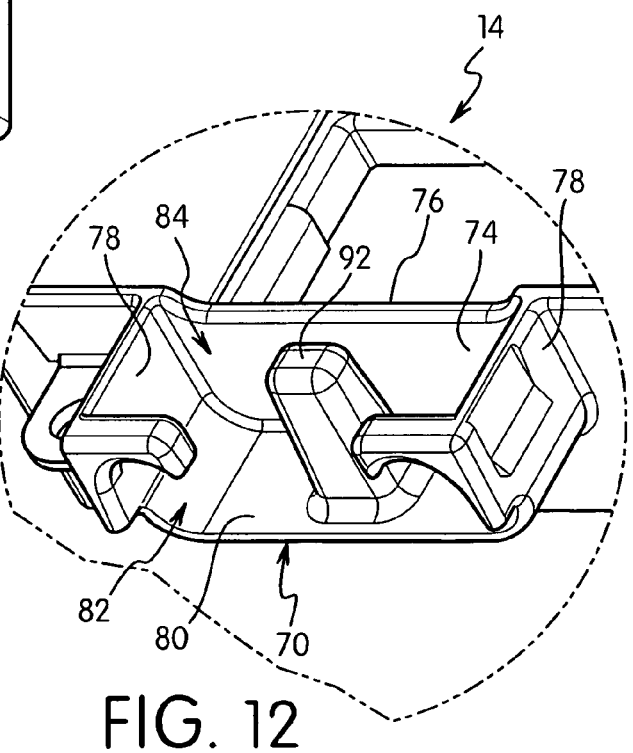
FIG. 12 is a partial perspective view of the outer chamber of the body in the embodiment of FIG. 1.

Outer chamber 70, in the embodiment illustrated, has an open front end 82 aligned with and facing barrier 74. Outer chamber 70 also has an open top end 84 aligned with the open top end of body 14. Referring to FIGS. 11 and 12, outer chamber 70 includes cord holding members shown as a cord hook 86 for retaining electrical cord 72 within outer chamber 70. The cord holding members form a passage into outer chamber 70 for the electrical cord. In one embodiment of the invention, cord hook 86 is coupled to each side wall 78 of outer chamber 70. As shown in FIG. 12, cord hook 86 extends from side wall 78 inwardly toward the center of the outer chamber. Each cord hook 86 has a top surface 88 shown as being substantially flat and a bottom surface 90 for engaging the electrical cord 72. As shown, bottom surface 90 has a concave shape complimenting the curvature of electrical cord 72. Preferably a cord hook 86 extends from each side wall 78 and the cord hooks 86 are positioned to oppose each other as shown in FIGS. 11 and 12. Referring to FIG. 6, bottom surface 90 of cord hook 86 is positioned below the top edge 76 of barrier 74. Cord hooks 86, side wall 78 and bottom wall 80 of outer chamber 70 define the open front end 82 and an access opening for electrical cord 72 into outer chamber 70.

As shown in FIG. 12, a divider member 92 is provided in outer chamber 70 and is positioned between cord hooks 86. Divider 92 is positioned and has a dimension to separate two electrical cords 72 when the electrical cords are retained by the respective cord hook 86. In the embodiment shown, divider 92 is in the form of a pillar that extends upwardly from bottom wall 80 of outer chamber 70. Typically, divider 92 is integrally formed with bottom wall 80 as a molded one piece assembly. In alternative embodiments, divider 92 can be coupled to barrier 74 or front wall 62. Divider 92 can have any suitable shape such as a flat planar member capable of separating two electrical cords.

A locking flange 94 having an aperture 96 is coupled to side wall 78 of outer chamber and front wall 62 of body 14. Aperture 96 has a dimension for receiving the shank of a lock member for locking cover 16 in a closed position. The opposite side wall 78 of outer chamber 70 is formed with an integral hook member 98 for latching cover 16 in a closed position.

Cover 16 has a shape and dimension to enclose the open top end of body 14. As shown in the drawings, cover 16 also has a dimension to cover the open end of inner chamber 68 and outer chamber 70 when cover 16 is in the closed position. Cover 16 has a top wall 100, side walls 102, and a bottom lip 104. Lip 104 has an outer dimension to fit over the outer edge of body 14. As shown in FIG. 5, side portions 106 of lip 104 include an aperture aligned with a corresponding pivot pin 64 of body 14. Aperture 109 includes a notch 110 having a dimension corresponding to the dimension of leg 66 of pivot pin. As shown in FIG. 5, notch 110 is positioned substantially perpendicular to leg 66 when cover 16 is in the closed position on body 14. In this manner, leg 66 prevents unauthorized removal of cover 16 by prying or bending side portions 106 outwardly from body 14. Cover 16 can be pivoted with respect to body 14 to the opened position shown in FIG. 2 to align notch 110 with leg 66 to allow assembly and disassembly to cover 16 to body 14.

Cover 16 is provided with a front portion 112 having a dimension complementing the dimension of outer chamber 70. Lip 104 extends around front portion 112 and forms a continuous lip extending from cover 16. Lip 104 of cover portion 112 has an inner dimension to fit over the outer surface of outer chamber 70. Cover 16 has a height such that top wall 100 is spaced from top end 46 of body 14 to allow electrical cord 72 to pass between outer chamber 70 and inner chamber 68. In the embodiment illustrated, front portion 112 of cover 16 has a recessed portion 114 aligned with open front end 82 of outer chamber to form a cord access opening into outer chamber 70.

Figure 3:
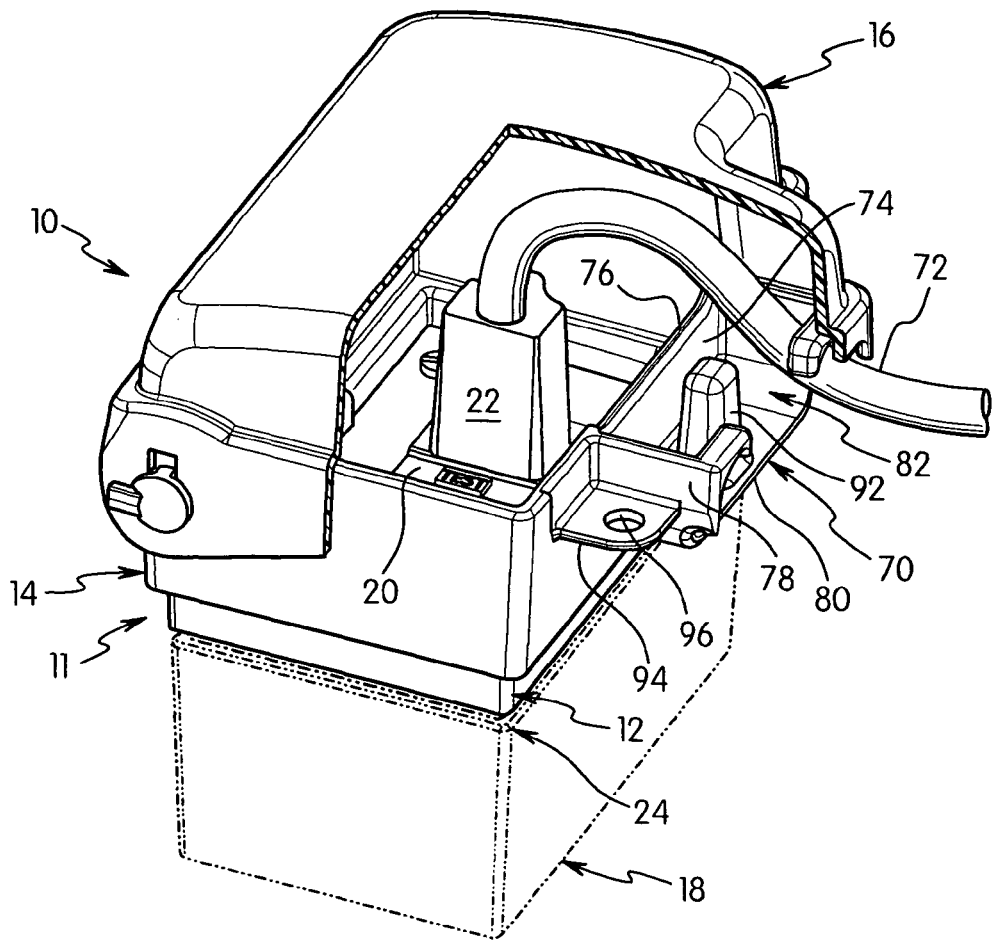
FIG. 3 is a perspective view of the embodiment of FIG. 1 showing a partial cross-section of the cover in the closed position.
Figure 4:
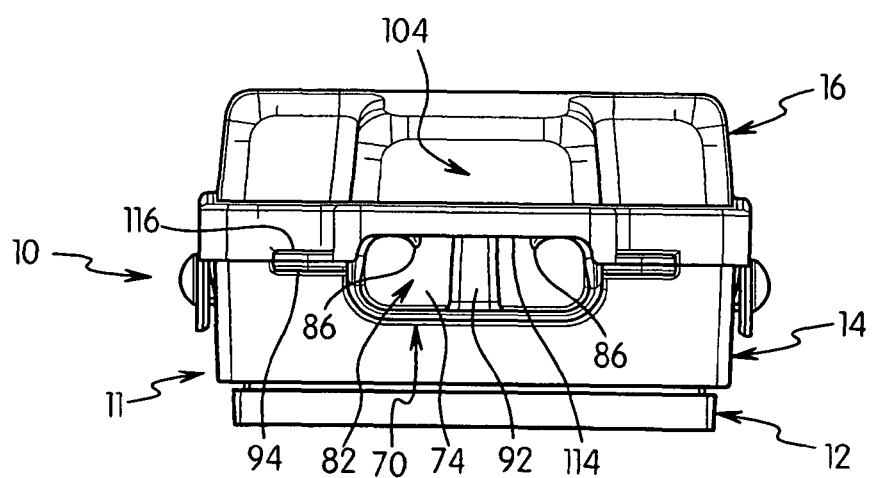
FIG. 4 is a front elevational view of the cover assembly of FIG. 1.

The cover assembly of the invention can be mounted to an electrical box in vertical orientation on a vertical surface or in a horizontal orientation on a horizontal surface as shown in the position of FIG. 1. The cord access opening of the outer chamber is formed between the cover and the outer chamber and preferably faces outwardly away from the housing. As shown in FIGS. 3 and 6, the cord access opening is positioned below the upper edge or lip of the barrier member and/or side wall of the housing so that the electrical cord follows a substantially U-shaped configuration between the cord access opening and the electrical receptacle.

Figure 7:
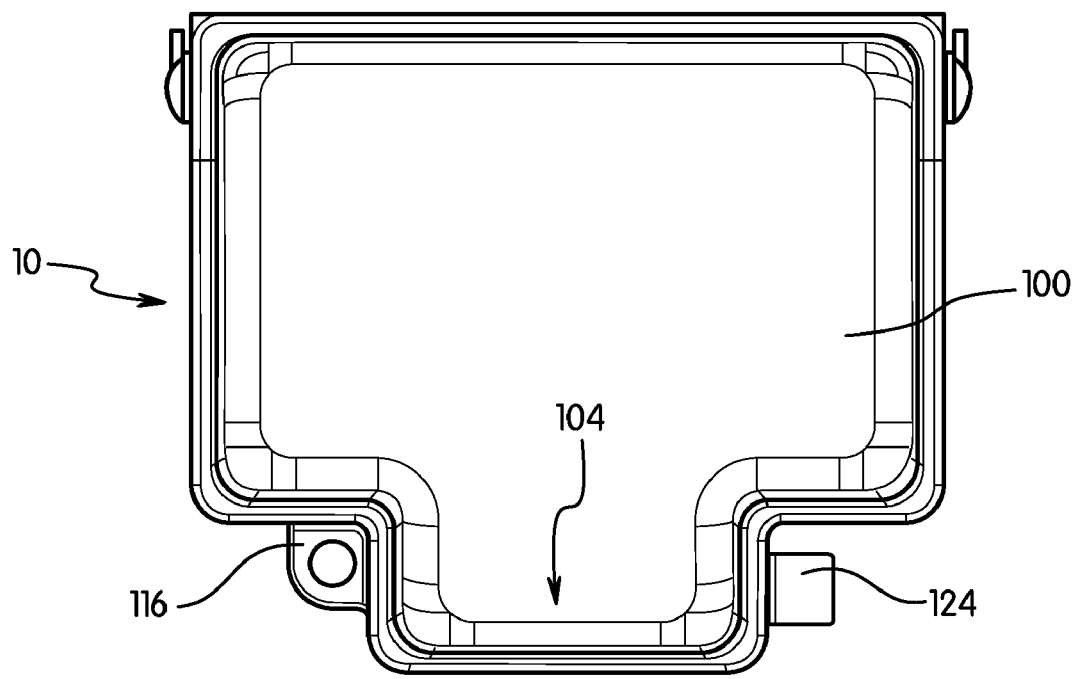
FIG. 7 is a top view of the cover assembly of FIG. 1.
Figure 8:
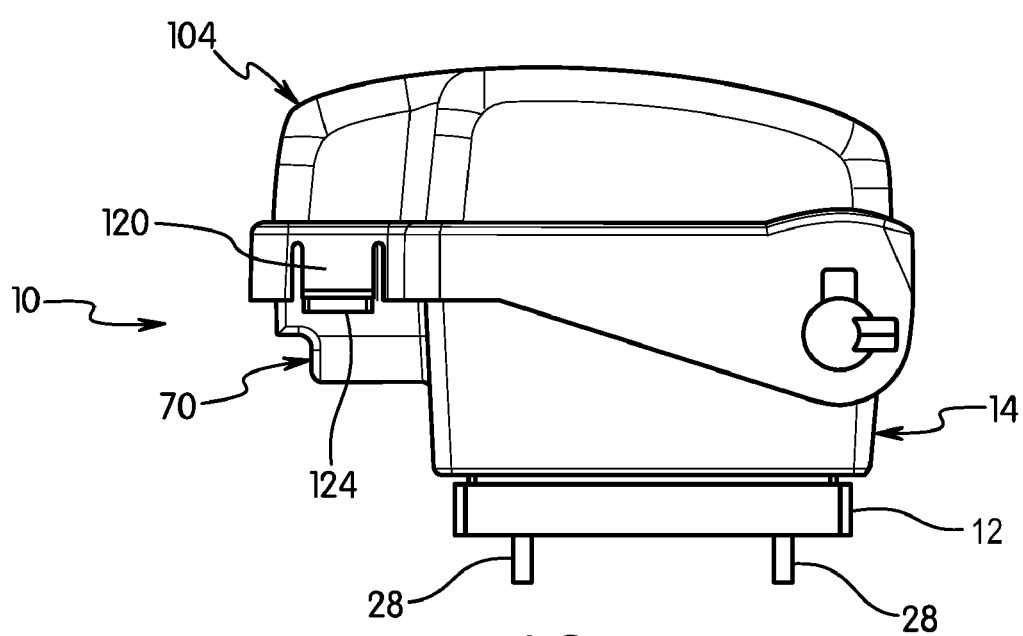
FIG. 8 is a side view of the cover assembly of FIG. 1.
Figure 9:
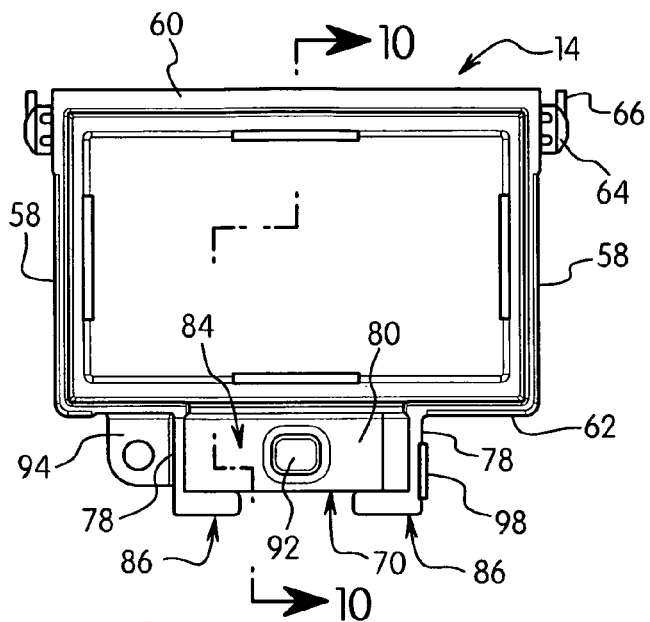
FIG. 9 is a top view of the body of the cover assembly of FIG. 1.
Figure 10:
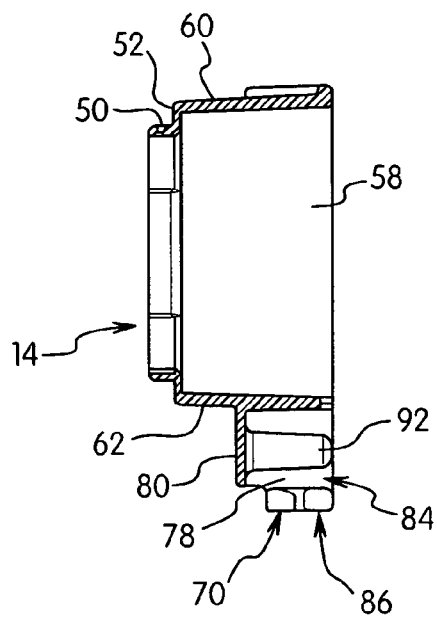
FIG. 10 is a cross-sectional end view of the body of the cover assembly taken along line 10-10 of FIG. 9.

As shown in FIG. 7, cover 16 includes a locking flange 116 aligned with locking flange 94 of body 14 and a latching member 118 aligned with hook member 98 for latching cover 16 in the closed position. Latch member 118 includes a flexible leg 120 with an inwardly extending hook member 122 for coupling with hook member 98. A thumb tab 124 is coupled to leg 120 to manually manipulate latch member 118.

Figure 2:
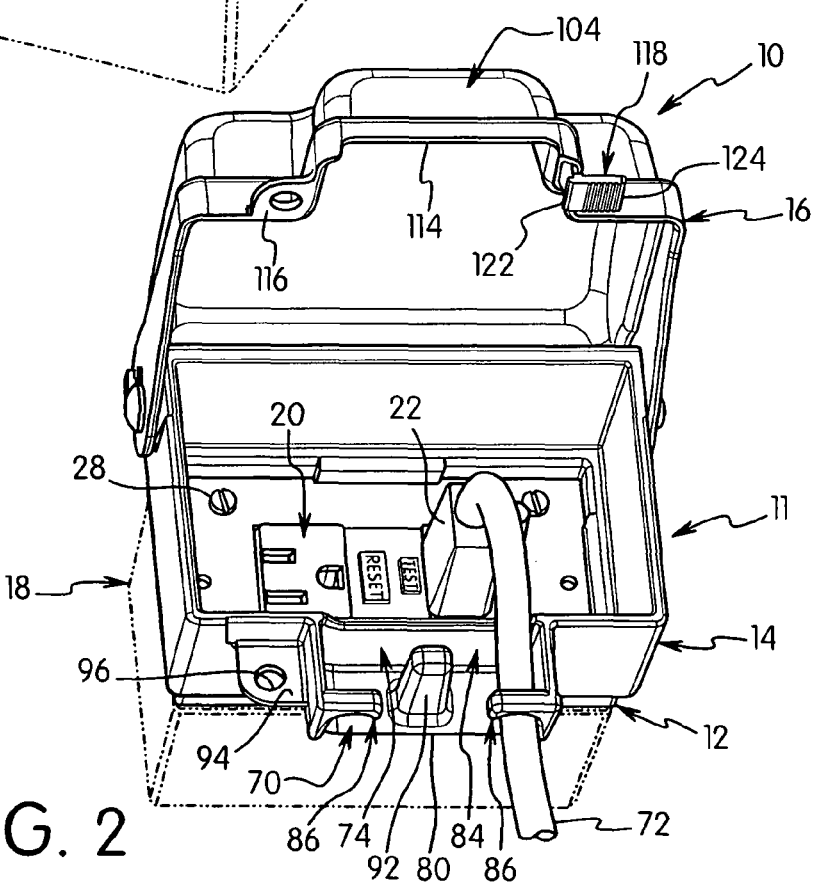
FIG. 2 is a perspective view of the cover assembly of FIG. 1 showing the cover in the opened position.

Cover 16 and body 14 and front portion 112 of cover 16 cooperate to enclose the electrical device and plug 22 when in the operating position. As shown in FIGS. 2 and 3, plug 22 is inserted into electrical device 20 and electrical cord 72 is fed from inner chamber 68 to outer chamber 70 over the top of barrier member 74 and hooked onto a respective cord hook 86. Divider 92 is positioned between inner chamber 68 and outer chamber 70 to form a circuitous path for electrical cord 72 as shown in FIG. 3. Barrier member 74 is positioned between the access opening of outer chamber 70 and inner chamber 68 so that electrical cord 72 bends upwardly and over barrier member 74 before reaching inner chamber 68. Barrier member 74 is preferably dimensioned and positioned to prevent a straight line between the access opening of the outer chamber and the inner chamber. Divider 92 inhibits rain, water and dirt from entering through the access opening of outer chamber and entering the inner chamber.

The cover assembly of the invention is constructed to provide weather protection of an electrical device and particularly an electrical receptacle while an electrical plug is coupled to the electrical receptacle. The housing of the cover assembly as shown and described in the above forms a circuitous path for the electrical cord between the electrical receptacle and the access opening or outlet of the cover assembly. The barrier member is positioned between the access opening and the interior inner chamber of housing so that water and debris can not pass directly from the access opening to the inner chamber.

In the embodiment shown in the drawings, the cover has a dimension to be spaced from the barrier member so that the circuitous path is defined by the housing and cover. In the illustrated embodiment, the path for the electrical cord formed by the cover and housing has a substantially U-shaped bend as shown in FIG. 3. In this embodiment, cord 72 extends in a generally upward direction from the electrical receptacle and passes over the barrier 72 in a U-shaped path. The electrical cord then extends perpendicular and through the cord hooks and the access opening of the outer chamber.

The circuitous path of the electrical cord can be provided by other arrangements of the components of the cover assembly of the invention. For example, in one embodiment the outer chamber can be formed without the side walls 78 so that bottom wall 80 forms a flange extending perpendicular to the plane of the wall 62. The cover 16 can be formed with a side wall with a dimension to overlie the edges of the bottom wall to form the outer chamber when the cover is closed. Cord hooks are generally provided to hold the electrical cords as they bend over the upper edge of the body of the housing. The cover generally has an access opening cooperating with the bottom wall of the outer chamber and is aligned with the portion of the side wall of the body which defines the barrier member.

In another embodiment, the cover assembly can have a flange extending inwardly from an inner surface of the cover. The flange is located in relation to the cord access opening so that the cord assumes a circuitous path between the access opening and the inner chamber of the body.

While various embodiments have been described and shown of the invention, it would be understood by those skilled in the art that various changes and modifications can be made without departing from the scope of the invention as defined in the appended claims.

What is claimed is:

1. A cover assembly for an electrical box, comprising:
 a housing for coupling to an electrical box, said housing having a bottom wall for coupling to the electrical box and a side wall defining an inner chamber, said housing having an outer chamber and a cord access opening into said outer chamber for guiding an electrical cord to said inner chamber, said inner chamber and said outer chamber being separated by a barrier member, said barrier member being fixed to a bottom surface of said outer chamber; and
 a cover hinged to said housing and being pivotable between an open position and a closed position where said cover overlies said first and second chambers when in said closed position and where said barrier member has a height greater than the position of a bottom edge of said cover when said cover is in the closed position.

2. The cover assembly of claim 1, wherein
 said housing has a first side wall and an opposite second side wall, and said outer chamber having a first side wall and a second side wall extending from said second side wall of said housing, and where said second side wall of said housing member forms said barrier member.

3. The cover assembly of claim 2, wherein said outer chamber further comprises
 a bottom wall extending between said side walls of said outer chamber and being positioned between said bottom wall of said housing and a top edge of said second side wall of said housing.

4. The cover assembly of claim 3, wherein
said inner cavity and said cover have a dimension to enclose an electrical plug and cord when said cover is in the closed position, and where said cover has a bottom edge extending below the top edge of said second side wall of said housing when said cover is in the closed position.

5. The cover assembly of claim 3, wherein
said cord access opening is formed in said outer chamber, and where said second side wall of said barrier member forms a circuitous path between said access opening in said outer chamber and said inner chamber.

6. The cover assembly of claim 5, wherein
said outer chamber includes at least one cord holding member for positioning the electrical cord in the access opening of said outer chamber, said cord holding member having a bottom edge positioned below the top edge of said second side wall of said housing.

7. The cover assembly of claim 6, wherein said outer chamber comprises,
a pair of said holding members spaced apart from each other, and
a divider positioned in said second chamber and between said cord holding members.

8. The cover assembly of claim 7, wherein said cord holding members are integrally formed with said side walls of said outer chamber.

9. The cover assembly of claim 5, wherein
said access opening in said outer chamber is oriented with respect to said second side wall of said housing to inhibit water or debris from entering said inner chamber through said access opening in said outer chamber.

10. The cover assembly of claim 1, wherein said cord access opening is positioned below a top edge of said barrier member.

11. A weatherproof cover assembly for an electrical box comprising:
a housing for coupling to an electrical box, said housing having an inner chamber with a first side wall and an opposite second side wall and an inner cavity therebetween, and an outer chamber; a cover hinged to said housing and being movable from an open to a closed position to cover said inner chamber and outer chamber, said outer chamber having a bottom surface and an upwardly extending barrier member having a top edge, said cover having a bottom edge overlying said access opening and being spaced below said top edge of said barrier member when said cover is in the closed position; and
an access opening between said housing and cover for receiving an electrical cord and, being positioned to define a circuitous path from said access opening through said outer chamber over said top edge of said barrier member to said inner chamber to inhibit water from entering said inner chamber.

12. The cover assembly of claim 11, wherein
said housing includes a first end wall and a second end wall extending between said first and second side walls and defining said inner chamber, and
said outer chamber having first and second side walls extending from said second side wall of said housing.

13. The cover assembly of claim 11, wherein said cord access opening is formed in said outer chamber and where said access opening is positioned below a top edge of said second side wall of said housing and below said top edge of said barrier member.

14. The cover assembly of claim 12, wherein
said outer chamber further comprises at least one cord holding member in said cord access opening, said cord holding member having a downwardly facing bottom edge for holding a cord and being positioned below a top edge of said second side wall of said housing and below said top edge of said barrier member.

15. The cover assembly of claim 14 wherein said outer chamber further comprises
a bottom wall defining said bottom surface and extending from said second side wall of said housing and being spaced between a bottom edge and a top edge of said second side wall of said housing.

16. The cover assembly of claim 15, wherein
said cover has a bottom edge and top wall, said top wall being spaced from said bottom edge a distance to define the circuitous path from said opening in said outer chamber to said inner chamber.

17. The cover assembly of claim 15, wherein
said outer chamber comprises two of said cord holding members and a divider member positioned between said cord holding members.

18. The cover assembly of claim 11, wherein
said barrier member is integrally formed with said housing.

19. The cover assembly of claim 11, further comprising
at least one cord hook spaced outwardly from said barrier member and having a bottom edge positioned below said top edge of said barrier member.

20. The cover assembly of claim 11, wherein
said second wall of said housing forms said barrier member.

21. A weatherproof while-in-use cover assembly comprising:
an electrical box supporting an electrical device;
a housing coupled to said electrical box, said housing having a bottom wall with an opening for accessing the electrical device and a side wall extending from said bottom wall and defining an inner chamber, said housing further including an outer chamber separated from said inner chamber by said side wall of said housing, said side wall forming a barrier member between said inner chamber and outer chamber; and
a lid hinged to said housing and being pivotable between an open and closed position where said lid covers said first and second chambers when in said closed position.

22. The cover assembly of claim 21, wherein said outer chamber comprises,
a first and a second spaced-apart side wall extending outwardly from said side wall of said housing, said outer chamber having a cord opening spaced below a top edge of said side wall of said housing, said cord opening being exposed when said lid is in the closed position.

23. The cover assembly of claim 22, wherein
said inner cavity and said lid have a dimension to enclose an electrical plug and cord when said lid is in the closed position.

24. The cover assembly of claim 22, wherein
said side wall of said housing has wall portion extending between said first and second side walls of said outer chamber and defining said barrier member, and where said lid has a bottom edge positioned below said wall portion when said lid is in the closed position.

25. The cover assembly of claim 24, wherein
said cord opening is positioned below said wall portion.

26. A weatherproof while-in-use cover assembly comprising:
- a housing having a side wall defining an inner chamber, said housing further having an outer chamber with a bottom wall and an electrical cord access opening for guiding an electrical cord to said inner chamber, said side wall of said housing having a wall portion defining a barrier member between said inner chamber and outer chamber, said barrier member having a top edge spaced upwardly from said bottom wall of said outer chamber; and
- a cover hinged to said housing and being pivotable between an open position and a closed position where said cover overlies said first and second chambers when in said closed position.

27. The cover assembly of claim 26, wherein
said outer chamber includes at least one cord hook extending upwardly from said bottom wall of said outer chamber and being spaced outwardly from said barrier.

28. The cover assembly of claim 27, wherein
said at least one cord hook has a bottom edge spaced below a top edge of said barrier.

* * * * *